Jan. 4, 1938.　　　　J. GRUNDSTEIN　　　　2,104,299

MACHINE TOOL

Filed March 29, 1935

Inventor
Julius Grundstein
By Sommers & Young
Attys.

Patented Jan. 4, 1938

2,104,299

UNITED STATES PATENT OFFICE 2,104,299

MACHINE TOOL

Julius Grundstein, Frankfort-on-the-Main, Germany, assignor to Gesellschaft des ächten Naxos-Schmirgels Naxos-Union Schmirgel-Dampfwerk, Frankfurt a. M., Julius Pfungst, Frankfort-on-the-Main, Germany Application March 29, 1935, Serial No. 13,762
In Germany July 17, 1934

6 Claims. (Cl. 308—3)

In machine tools with reciprocating tables or slides, such as planing, milling and grinding machines for instance, the precise adjustment of the guides screwed on the beds has been effected by making the bed itself adjustable at various points by means of wedges or screws engaging the bed at a series of successive points. This is very inconvenient as large forces are required for moving the bed.

One object of the present invention is to eliminate this adjustment of the entire bed in such machine tools, and to make the actual guide only adjustable. The bed can then be immovably secured to the foundation, for example by embedding it therein, so that an invariable support is provided for the adjusting devices.

According to the invention the guide is no longer rigidly clamped to the bed but a series of spaced clamping devices is arranged between bed and guide and enable the guide to be adjusted by virtue of the flexibility of the material thereof. Such adjusting devices may be provided on one of the guides only or both guides may be made adjustable.

Preferably the points on the guide at which the adjusting devices engage are so spaced that the spacing is less than the length of the slide or table which is to be guided.

Any suitable form of adjusting device can be employed; drawing or thrust screws or wedges moved by screws or other gearing can conveniently be used.

In the case of three track guides it has already been proposed to make one flat track uniformly displaceable over its entire length in the vertical direction relatively to the bed, so as to enable uniform contact with and pressure on the three tracks. In contradistinction thereto, the guide according to the present invention is mounted so as to be adjustable at individual points both in the vertical and in the horizontal direction, so that a precise rectilinear guidance is obtained.

One embodiment of the arrangement for adjusting the guide in accordance with the present invention is shown by way of example in the accompanying drawing, in which:—

The guide $b$ mounted on the bed $a$ is held by the screw $c$ introduced from below. Disposed beneath the guide $b$ is a wedge $d$ provided with a central aperture $e$ for the passage of the screw $c$ and with a recess $f$ to receive the head $g$ of a bolt $h$. The bolt $h$ passes through a threaded aperture in the bed $a$ at $i$ and can be secured in its position by means of a lock-nut $j$. This arrangement serves for adjusting the guide $b$ in the vertical direction.

The adjustment in the horizontal direction is effected on one side by means of the screw $k$ which bears against a bar $l$ contacting laterally with the guide $b$. The screw $k$ can be secured in adjusted position by means of the lock-nut $m$. On the other side of the guide $b$, the wedge member $o$ which can be moved up and down by the screws $p$ engaging in the bed, is disposed between the flange $n$ of the bed $a$ and the guide $b$.

The slide carried on the guide $b$ is indicated at $q$.

By adjusting the screw $h$ the wedge $d$ can be displaced horizontally and as its inclined surface is lowermost, it moves the guide $b$ in the vertical direction. This wedge mechanism enables an extremely accurate adjustment of the guide $b$.

In the case illustrated, the lateral adjustment is effected on the one hand by the screw $k$ and on the other hand by the wedge member $o$ which can be raised or lowered by the screw $p$.

Figure 1:
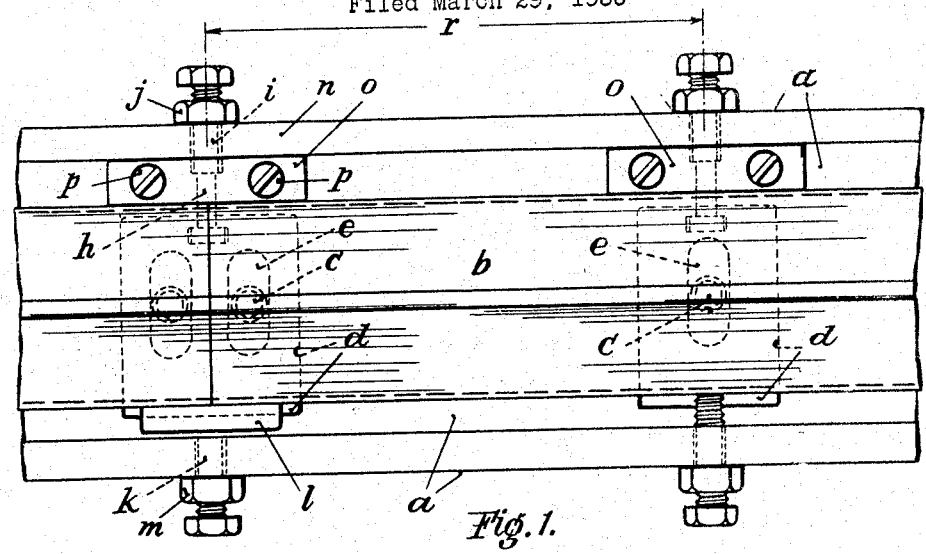
Fig. 1 shows a top view of a section of a long guide provided with the adjusting devices.
Figure 2:
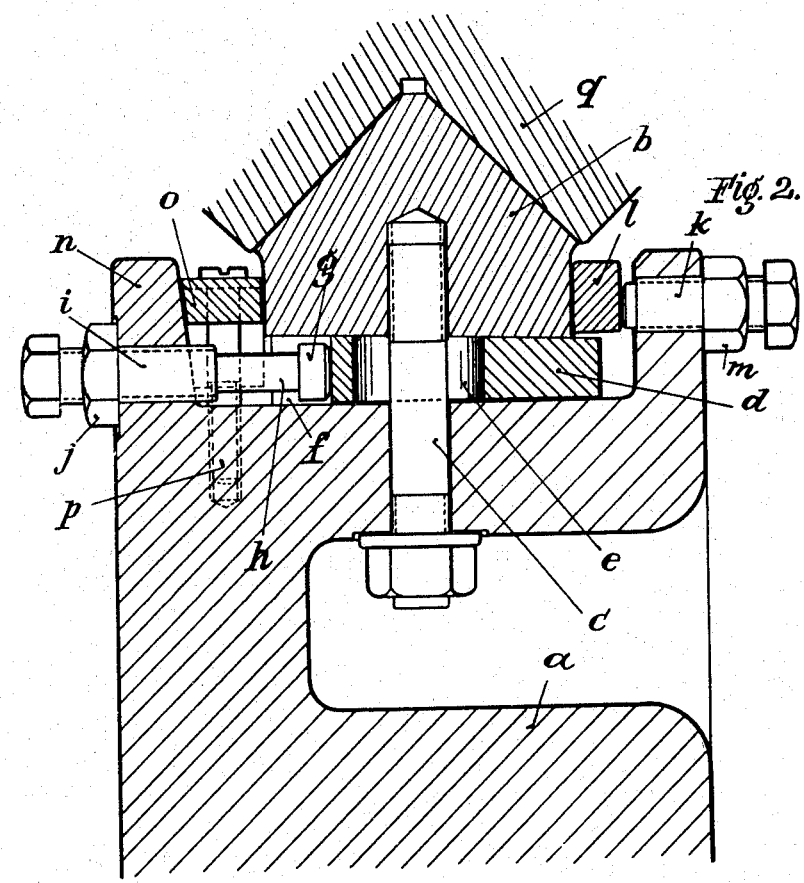
Fig. 2 shows an enlarged sectional view through bed, guide and associated adjusting device.

As seen from Fig. 1, adjusting devices as described above are provided at a definite spacing $r$ on the guide $b$, the spacing $r$ preferably being smaller than the length of the table or slide mounted on the guide. The load on the guide can also be taken into account in determining the spacing.

Naturally any other mechanism such as two thrust or traction screws or the like may be employed for the vertical adjustment in place of the wedge mechanism and similarly the wedge device $o$ can be replaced by another mechanism such as a thrust screw. Conversely the thrust screw $k$ could be replaced by a wedge mechanism. Equally all adjusting devices could be in the form of wedge mechanisms or all in the form of screw mechanisms.

The guide may be of any desired configuration and the adjusting devices could be provided on guides with a plane upper surface.

I claim:—

1. Adjustable guide arrangement for reciprocatory elements of machine tools traversing long paths comprising, a bed, a guide rail of considerable length and having appreciable elastic flexibility, vertically and laterally, the reciprocatory element being mounted on and supported by said rail, a plurality of independent adjusting devices provided on the bed spaced apart at a plurality of points along the rail for supporting and securing said rail on said bed and for effecting independent vertical and lateral adjustments of local portions of the rail, utilizing the elastic flexibility of the rail to adjust it to an accurately rectilinear path.

2. Adjustable guide arrangement for reciprocating tables of machine tool elements which traverse long paths, comprising, a bed, a guide rail of considerable length and having appreciable elastic flexibility vertically and laterally, said rail having a V-shaped transverse cross section, the reciprocatory element being mounted on and supported by said rail, independently adjustable devices provided on the bed at a plurality of points spaced along the rail for supporting and securing said rail on said bed and for effecting independent vertical and lateral adjustments of local portions of the rail, utilizing the elastic flexibility of the rail to adjust it to an accurately rectilinear path.

3. Adjustable guide arrangement for reciprocating elements of machine tools traversing long paths comprising, a bed, a supporting running guide rail of considerable length and having appreciable elastic flexibility, vertically and laterally adjustable screw devices provided on the bed at a plurality of points spaced along the guide rail for supporting and securing said rail on said bed and for effecting independent vertical and lateral adjustments of local portions of the rail, utilizing the elastic flexibility of the rail to adjust it to an accurately rectilinear path.

4. In machine tools having a reciprocatory element which traverses a long path, an adjustable guide arrangement comprising, a bed, a supporting running guide rail of considerable length and having appreciable elastic flexibility, vertically and laterally, independently adjustable wedge means provided on the bed at a plurality of points spaced along the rail for supporting and securing said rail on said bed for effecting independent vertical and lateral adjustments of local portions of the rail, utilizing the elastic flexibility of the rail to adjust it to an accurately rectilinear path, said reciprocatory element being supported on and guided by said rail.

5. An adjustable guide arrangement for machine tools comprising a guide, a supporting bed for said guide having upstanding flanges on either side thereof, spaced apertured wedges interposed between said guide and the bed, clamping screws passing from the bed through said wedges into the guide at each wedge, a bolt threaded through an upstanding flange on the bed and engaging said wedge for horizontal displacement thereof, interposed wedge means between said flange and one side of the guide, means threadedly engaging the bed for vertical adjustment of said last mentioned wedge means, and screw means threaded through the other upstanding flange on the bed on the other side of the guide and bearing against a bar disposed laterally against said other side of the guide adjacent said first mentioned wedge.

6. In machine tools including a slidable table, an adjustable guide arrangement for said table including an elongated bed, a guide element of considerable length adapted to be tensioned both vertically and laterally, a plurality of vertically and laterally adjustable means for supporting and securing said guide element in position on said bed, said means being located on said bed at spaced intervals throughout the length of said guide element and operative to tension said guide element both vertically and laterally at said spaced intervals whereby, due to the length of said guide element and the positioning of said adjusting means at a plurality of points from end to end thereof, said guide element may be bodily adjusted and also vertically and laterally tensioned to effect minute adjustments through flexure of the guide element itself.

JULIUS GRUNDSTEIN.